United States Patent [19]

Venis

[11] 4,145,710

[45] Mar. 20, 1979

[54] METHOD AND APPARATUS FOR DIGITALLY RECORDING TELEVISION IMAGES ON FILM

[75] Inventor: Ronald J. Venis, Sevenoaks, England

[73] Assignee: Colour Video Services, France

[21] Appl. No.: 834,821

[22] Filed: Sep. 19, 1977

[51] Int. Cl.² .............................................. H04N 5/84
[52] U.S. Cl. ........................................ 358/7; 358/130
[58] Field of Search .................................. 358/7, 130

[56] References Cited

U.S. PATENT DOCUMENTS

| 3,730,976 | 5/1973 | Parker | 358/7 |
| 3,891,794 | 6/1975 | Russell | 358/130 |

*Primary Examiner*—Robert L. Richardson

*Attorney, Agent, or Firm*—Robert D. Yeager

[57] ABSTRACT

A method and apparatus for recording sequences of successive television images on cine film and particularly color images on conventional motion picture film including the steps of converting an analogue television signal to a digital signal comprising a chain of "bits," storing the "bits" in a storage device having the capacity to store a complete television picture under the control of timing signals, applying timing pulses of a different frequency to the storage device to empty the storage device at a faster rate than that required to fill the same to reduce the duration of each frame with consequent increase in the blanking interval to a value such as to accommodate the pull-down mechanism of a film camera.

6 Claims, 3 Drawing Figures

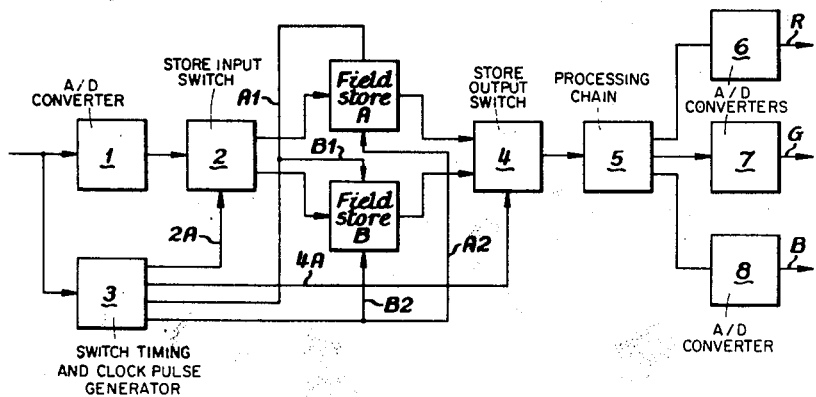

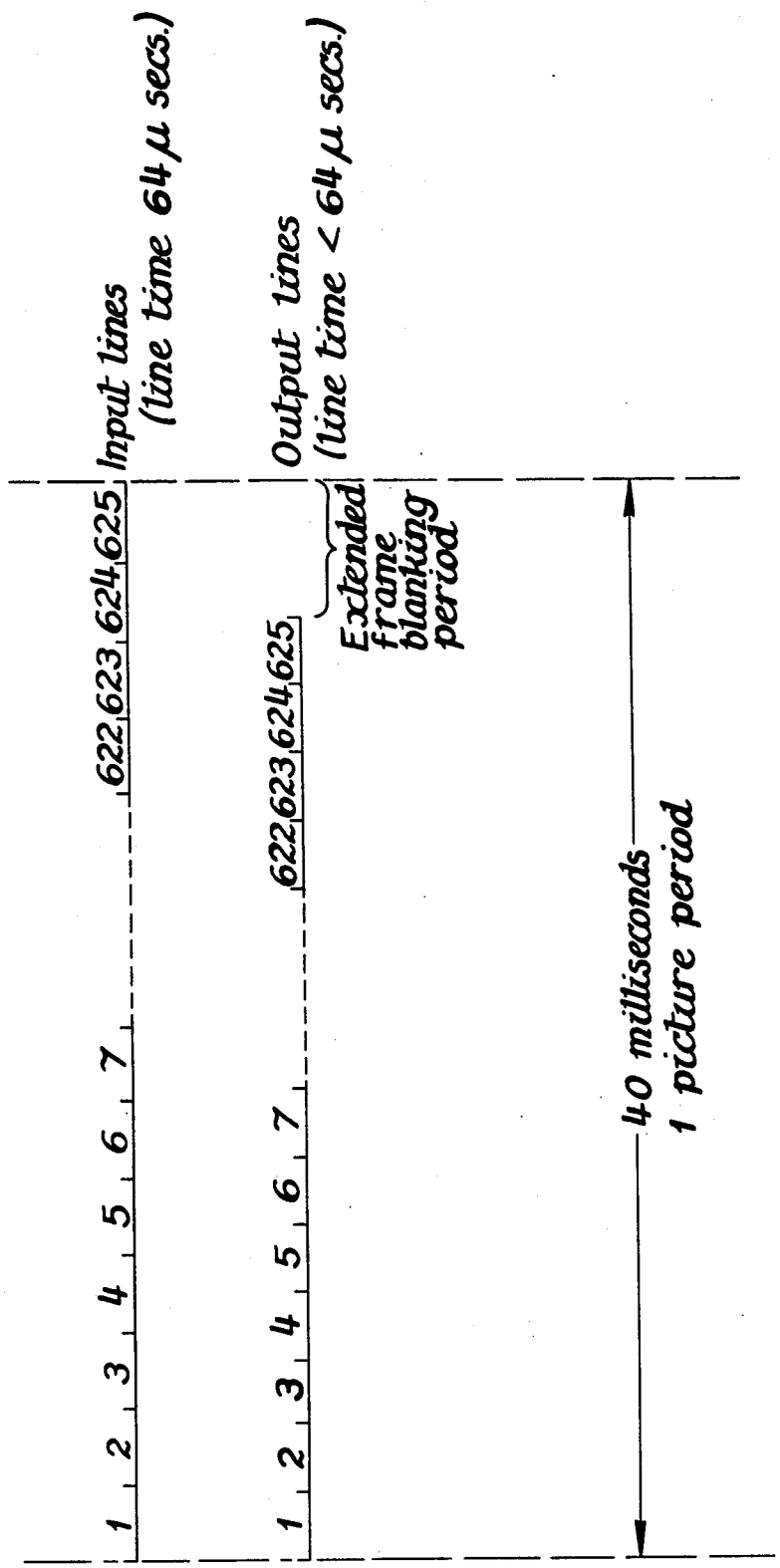

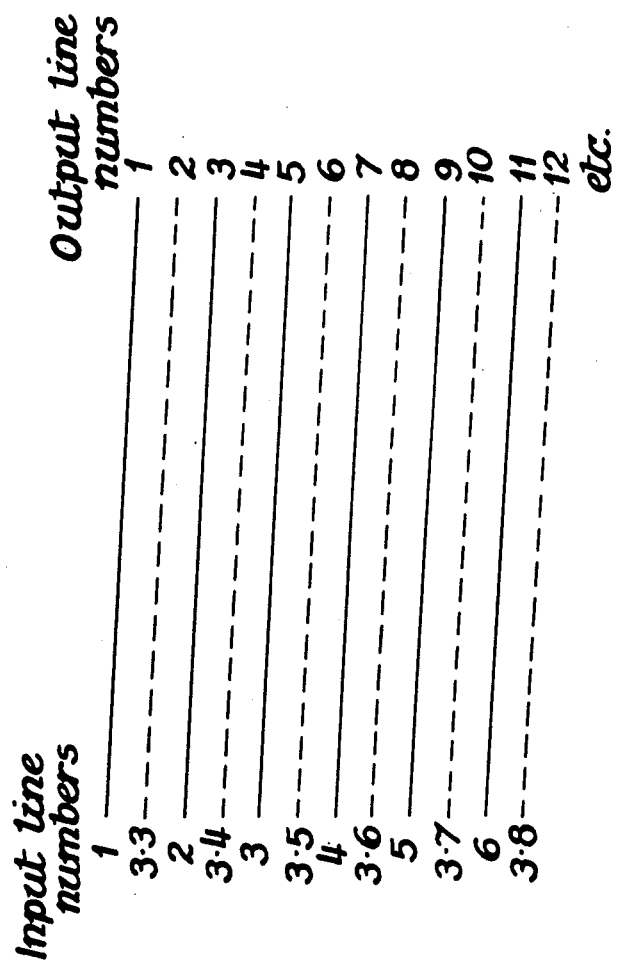

METHOD AND APPARATUS FOR DIGITALLY RECORDING TELEVISION IMAGES ON FILM

BACKGROUND OF THE INVENTION

1. Field of the Invention

This invention relates to a method and apparatus for recording television images and particularly color images onto conventional motion picture film.

2. Description of the Prior Art

The process of recording color or black and white television images on to conventional color or black and white motion picture film is made difficult, in one particular respect, by the short period of time available between successive television pictures.

The problems arise principally with television signals from 625 line 50 field systems and these problems will be discussed below. Somewhat different problems arise with 525/60 systems.

The normal 2:1 interlaced television signal comprises two fields each of nominally 20 milliseconds duration. 1.6 milliseconds of each field contains no picture information and is known as "field blanking." An ideal film recording system exposes successive frames of film at the rate of 25 per second and is synchronized to the picture rate of the television signal. It is clearly desirable to record on to each film frame two complete interlaced television fields. This requires that, if a conventional type of intermittent film transport is used, the film is transported from one frame to the next within the field blanking period of 1.6 millisecs.

In the case of 35 mm film this requirement cannot be met. The required accelerations would destroy either the film or the pull down mechanism. In the case of 1 mm film it is just possible to achieve pull down in 1.6 milliseconds but only with a high risk of film damage and frame-to-frame instability. The alternative methods presently available are shown below, but all are compromises and all result in degradation of picture quality.

| METHOD | DESCRIPTION | DISADVANTAGES |
| --- | --- | --- |
| 1. Fast Pull down Camera. | Achieves film pull down within field blanking. | Frame to frame instability difficult to control. High risk of film damage. |
| 2. Suppressed field. | Only attempts to record every alternate film. | Only half information system. |
| 3. Stored Field. | Long persistence phosphor used in display. Field written on CRT during camera shutter closing time is still present to expose film when shutter opens again. | Exposure is different between fields. Persistance is too long and causes movement smear. Impossible with colour displays because phosphors of different colours do not all have same afterglow time. |
| 4. Partial stored Field. | Similar to 3 but time periods for afterglow and shutter closing shorter. | As 3. |
| 5. Continuous motion | Film motion is continuous, i.e. not intermittent, and contributes to vertical component of scanning. | Optical compensating system required for offset of film motion causes flare due to inevitable presence of much glass and is optically inefficent (f No. is high) |

The so-called "pull down" problem is therefore quite fundamental to television film recording and has a primary limiting effect on the recording quality obtainable.

SUMMARY OF THE INVENTION

An object of the present invention is to provide a method and apparatus for recording television images on conventional motion picture film and which overcomes the so-called "pull down" problem with consequent improvement of the film recording quality.

Recent developments in integrated circuit technology now make it technically and economically feasible to overcome this particular problem in a completely satisfactory manner and, incidentally, achieve further benefits.

Thus, according to the present invention there is provided a method of recording sequences of successive television images on cine film including the steps of passing an analogue television signal which drives a recorder display to an analogue-to-digital converter to convert the analogue signal to a digital signal comprising a chain of 'bits' representative of a television picture, passing the 'bits' into a sequentially stepping storage device having a capacity equivalent to a complete television picture; under the control of timing pulses having a predetermined frequency, to fill the storage device with said "bits," applying to the storage device further timing pulses having a frequency different from the predetermined frequency of the first-mentioned timing pulses, to empty the storage device at a faster rate from that required to fill the storage device, to thereby reduce the duration of each frame at the output of the storage device with consequent increase in the blanking interval to a value such as to accommodate an intermittently actuated pull down mechanism of a film camera viewing said recorder display.

The television signal which drives the recorder display which may be cathode ray tubes or perhaps laser beams, is of the conventional form and is an analogue signal. In a preferred embodiment of the invention, this analogue signal is passed to a suitable analogue-to-digital converter from which it emerges as a digital signal comprising a chain of 'bits' having only one of two levels. The precise nature of the sampling and quantizing of the incoming signal is not important but may follow current recommendations, i.e: sampling at approximately 13 MHZ and quantizing into 256 levels to produce 8 bit words.

As is well known, these "bits" may be stored in a variety of ways. In an embodiment of the present invention, the storage means used is the "shift register" type of store wherein a "bit" supplied to the input of the register may be stepped through the successive stages of the register to emerge at the output of the register, by the application thereto of so-called "clock pulses."

If, for example, a 256 stage shift register is presented with 256 "bits" successively at its input, then, after 256 "clock pulses" all the "bits" will be stored in the register. If the clock pulses cease at this time then the 256 bits stored in the register will remain there. The time taken to completely fill the register clearly depends upon the incoming bit rate and the clock pulse frequency must be chosen to match this.

If, after a shift register has been filled to capacity, further clock pulses are applied, the contents of the register will be stepped and each bit will appear successively at the output of the register. The time taken to empty the register depends only upon the chosen clock pulse frequency and this may obviously be different than the clock frequency chosen to fill the register.

By a suitable combination of a sufficient number of shift registers it is possible to store all the "bits" comprising a television field. By a suitable choice of clock pulse frequency, the store may be emptied at a faster rate than it was filled. Thus, at the output of the store, all the bits comprising one field occur in a shorter time than at the store input, and so the field time has been reduced. This concept is already applied in, for example, a digital standards converter where the conversion from a 60 field/sec. system to a 50 field/sec. system clearly requires an alteration in field timing.

In a film recording application the shift register store must be able to hold a complete television picture — i.e., two successive fields. Thus the total frame time at the store output may be reduced from 40 millisecs to, say, 30 millisecs, or some other convenient time. Because successive frames occur at the input at intervals of 40 millisecs, then successive frames will appear at the store output at intervals of 40 millisecs. What has been altered is the duration of each frame at the store output. By implication, therefore, the blanking interval between frames is lengthened by the same amount as the frame time is shortened. This extended frame blanking interval is available for film pull down in the camera and clearly may be so chosen that pull down is within the capacity of and easily accomplished by a conventional type of intermittent motion film transport. No picture information is lost as a result of this; it is merely presented to each frame in appropriately shorter time.

Thus, by means of the present invention the digitising of the incoming television signal permits the use of shift register storage and this, in turn, enables the "pull down" problem to be completely solved without any degradation of picture quality or reduction in performance.

By suitable arrangement of the input and output switching to and from the shift register store, it is possible to eliminate the interlacing of successive fields. The switching may, for example, be arranged so as to take out of the store, say, line one from field one, followed by line one from field two. This rearrangement of the signal so that interlace is eliminated and all the picture scanning lines are presented sequentially, has certain advantages in a film recording system. These are mainly concerned with the elimination of interlacing errors and the improvement made possible to vertical aperture correction by the availability of spatially as well as temporally adjacent lines.

As previously described, the television signal which drives the recorder display, i.e., cathode ray tubes or laser beams, is an analogue signal which is converted to digital form for the purposes of the present invention to enable the shift register storage to be used. After storage of the digital signals, it is necessary to convert them back to analogue form in order to modulate the cathode ray tubes or the laser beams constituting the recorder display.

BRIEF DESCRIPTION OF THE DRAWINGS

A preferred embodiment of the invention is illustrated in the accompanying drawings wherein:

FIG. 2 is a diagram of the input and output lines for one picture period showing how the frame blanking period is increased; and, FIG. 3 is a diagram indicating the relationship between the input line numbers and the output line numbers.

DESCRIPTION OF THE PREFERRED EMBODIMENT

Figure 1:
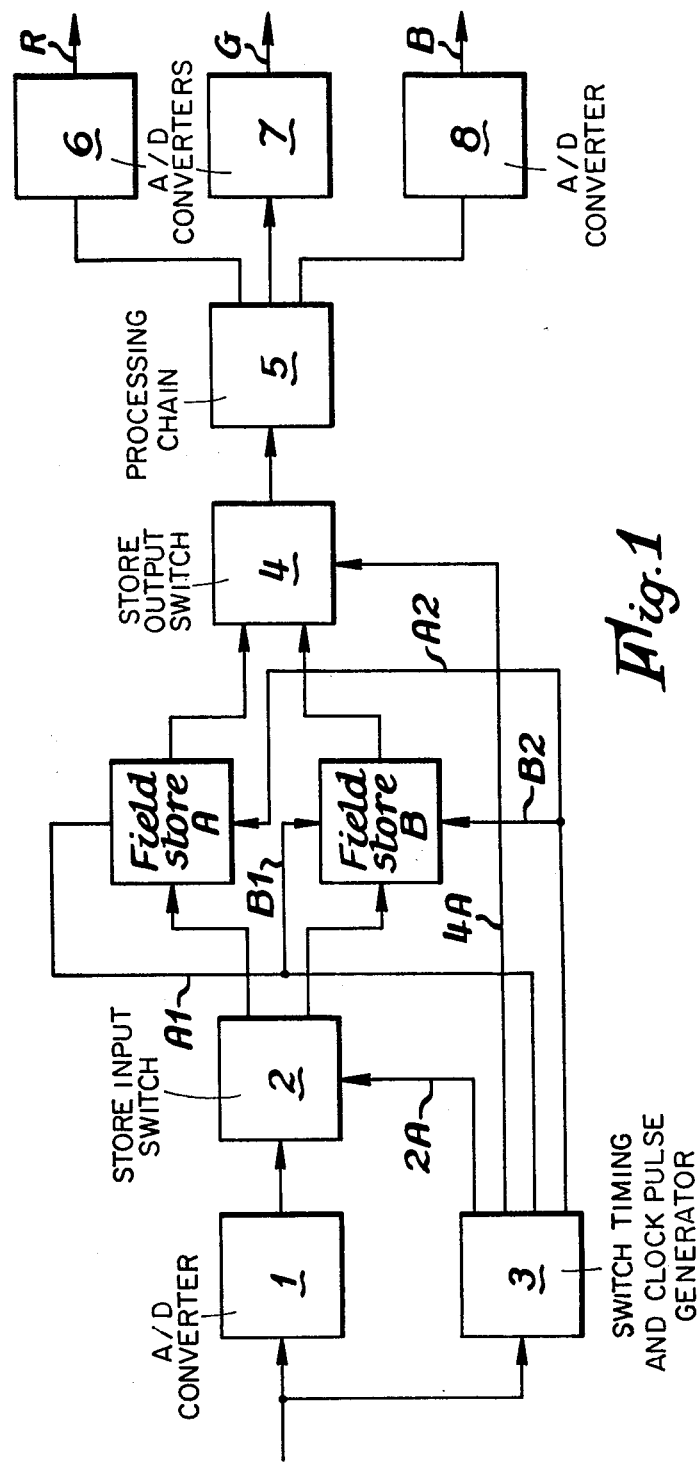
FIG. 1 is a block schematic diagram of apparatus for recording television images on film and employing the principles described herein.

In FIG. 1, the input signal is for a 625 line 50 field television system although it will be appreciated that the invention is applicable to other television systems, e.g., 525/60 systems.

The incoming composite video signal is applied to the input of an analogue-to-digital converter 1 where it is suitably quantized. The digital output of the converter 1 passes to a store input switch 2 which operates at field frequency, so that all the 'bits' sequentially representing the first incoming television field are fed into storage unit 'A', and all the 'bits' representing the second incoming television field are fed into storage unit B. The store input switch 2 is controlled by information derived from the synchronising pulses contained in the composite input signal which is fed in parallel to the analogue-to-digital converter 1 and the switch timing and clock pulse generator 3 over line 2A. Unit 3 also generates the 'write' clock pulses required to effect the entry of pulses in the shift registers of storage units 'A' and 'B' on lines A1, B1, and which are arranged as parallel combinations of shift registers of sufficient capacity to store each incoming line separately.

After a predetermined time period has elapsed during which storage unit 'A' has been filled with an incoming field and storage unit 'B' is in the process of filling up, the 'read' process on the storage units is initiated.

A store output switch 4 operates at the store output line frequency and selects one line from storage unit 'A' and the next line from storage unit 'B', and progressing alternately in this manner as indicated in FIG. 3; the full lines indicating lines of input field 1 of store A and the dotted lines representing lines of input field 2 of store B. By this means interlacing is eliminated. The control of store output switch 4 is effected over line 4A (FIG. 1).

The read out of data from the storage units 'A and B' is controlled by the 'read' clock pulses generated in the switch timing and clock pulse generator 3 over lines A2, B2. The 'read' clock pulses have a higher frequency than the 'write' clock pulses such that any given line is read out from a storage unit in a shorter time than it is written thereinto.

Each incoming television picture period is nominally 40 milliseconds and contains 625 lines each having a duration of approximately 64$\mu$ secs. The output picture rate is required to be 25 per second (1 picture = 40milliseconds) and the number of lines is required to be the same as the input. As can be seen from FIG. 2, the effect of taking out of store 625 lines per picture where each line duration has been shortened, is to extend the period between the end of one picture and the start of the next, without changing the picture rate, i.e., the Frame Blanking period has been increased.

The remaining stages of the apparatus of FIG. 1 comprise a processing chain 5 which typically contains a decoder to resolve the composite signal into its Red, Green and Blue components and subsequent aperture and gamma correcting stages as required for film recording purposes. Each signal is then converted back to an analogue form by digital-to-analogue converters 6, 7, 8, prior to being used to drive the display device.

I claim:

1. A method of recording sequences of successive television images on cine film including the steps of passing an analogue television signal which drives a recorder display to an analogue-to-digital converter to convert the analogue signal to a digital signal comprising a chain of 'bits' representative of a television picture, passing the 'bits' into a sequentially stepping storage device having a capacity equivalent to a complete television picture under the control of timing pulses having a predetermined frequency, to fill the storage device with said 'bits,' applying to the storage device further timing pulses having a frequency different from the predetermined frequency of the first mentioned timing pulses, to empty the storage device at a faster rate from that required to fill the storage device, to reduce the duration of each frame at the output of the storage device with consequent increase in the blanking interval to a value such as to accommodate an intermittently actuated pull down mechanism of a film camera viewing said recorder display.

2. A method as claimed in claim 1 wherein the output of said analogue-to-digital converter is applied to a switching device arranged to operate at television field frequency to direct all 'bits' sequentially representing a first incoming television field into a first storage unit of the storage device and to direct all 'bits' representing a second television field into a second storage unit of the storage device, the switching device being controlled by signals derived from a clock pulse generator in response to information derived from synchronising signals of the incoming analogue television signal.

3. A method as claimed in claim 2 wherein said storage units each comprise shift registers arranged to receive 'read' signals from the clock pulse generator having a higher frequency than those pulses used to 'write' data into the registers, such that any line is read out from a storage unit in a shorter time than that required to 'write' such line into a register.

4. A method as claimed in claim 3 and including a further switching device responsive to output signals from the shift registers and to control signals from the clock pulse generator, and operating at the output line frequency of the shift registers to select lines alternately from the shift registers of the storage units, and the read out of information from the shift registers being effected by 'read' signals supplied thereto from the clock pulse generator.

5. A method as claimed in claim 4 wherein output signals from the further switching device are supplied to a processing chain including a decoding device to resolve the composite television signal into primary colour component signals and a plurality of digital-to-analogue converters to convert the colour component signals to analogue form.

6. A method for recording television images on film comprising the steps of:
(a) converting an analog television signal to a digital signal comprising a chain of 'bits' representative of a television picture;
(b) storing the 'bits' in a storage device, having the capacity to store a complete television picture, under the control of a timing signal having a predetermined frequency;
(c) emptying the storage device at a faster rate than it was filled under the control of a timing signal having a frequency greater than the predetermined frequency;
(d) converting the signal from the storage device back to an analog form suitable for film recording; and,
(e) recording the converted analog signal on film.

* * * * *

UNITED STATES PATENT AND TRADEMARK OFFICE
CERTIFICATE OF CORRECTION

PATENT NO. : 4,145,710
DATED : March 20, 1979
INVENTOR(S) : Ronald J. Venis

It is certified that error appears in the above—identified patent and that said Letters Patent are hereby corrected as shown below:

Column 1, line 35, "1" should read --16--.

Signed and Sealed this

Twenty-ninth Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,145,710
DATED : March 20, 1979
INVENTOR(S) : Ronald J. Venis

It is certified that error appears in the above-identified patent and that said Letters Patent are hereby corrected as shown below:

The word "France" in item 73 should be --England--

Signed and Sealed this

Twenty-seventh Day of November 1979

[SEAL]

Attest:

RUTH C. MASON
Attesting Officer

LUTRELLE F. PARKER
Acting Commissioner of Patents and Trademarks